(12) United States Patent
Mocherla et al.

(10) Patent No.: US 10,732,636 B2
(45) Date of Patent: Aug. 4, 2020

(54) AUTOMATED DRIVING SYSTEM AND METHOD FOR ROAD VEHICLES

(71) Applicant: SIRAB TECHNOLOGIES TRANSPORTATION PRIVATE LIMITED, Chennai (IN)

(72) Inventors: Edwin Paul Mocherla, Chennai (IN); Sivakumar Pothan, Chennai (IN); Surya Kiran Satyavolu, Chennai (IN)

( * ) Notice: Subject to any disclaimer, the term of this patent is extended or adjusted under 35 U.S.C. 154(b) by 42 days.

(21) Appl. No.: 16/126,593

(22) Filed: Sep. 10, 2018

(65) Prior Publication Data

US 2019/0196478 A1  Jun. 27, 2019

Related U.S. Application Data

(63) Continuation-in-part of application No. 15/854,337, filed on Dec. 26, 2017.

(51) Int. Cl.

| | |
|---|---|
| G05D 1/02 | (2020.01) |
| G05D 1/00 | (2006.01) |
| G01S 13/931 | (2020.01) |
| B60W 30/00 | (2006.01) |
| G01S 13/60 | (2006.01) |

(52) U.S. Cl.
CPC .......... *G05D 1/0212* (2013.01); *B60W 30/00* (2013.01); *G01S 13/60* (2013.01); *G01S 13/931* (2013.01); *G05D 1/0088* (2013.01); *G05D 1/027* (2013.01); *G05D 1/0257* (2013.01); *G05D 1/0274* (2013.01); *G01S 2013/93271* (2020.01); *G01S 2013/93274* (2020.01); *G05D 2201/0213* (2013.01)

(58) Field of Classification Search
CPC .. G05D 1/0212; G05D 1/0257; G05D 1/0088; G05D 1/0274; G05D 1/027; G05D 2201/0213; G01S 13/931; G01S 13/60; G01S 2013/93271; G01S 2013/93274; B60W 30/00
USPC ......................................................... 701/23
See application file for complete search history.

(56) References Cited

U.S. PATENT DOCUMENTS

| | | | |
|---|---|---|---|
| 9,523,984 B1* | 12/2016 | Herbach | B62D 15/025 |
| 9,798,409 B1* | 10/2017 | Wells | G06F 3/0414 |
| 2012/0323474 A1* | 12/2012 | Breed | G01S 19/50 |
| | | | 701/117 |
| 2018/0297587 A1* | 10/2018 | Kasaiezadeh Mahabadi | |
| | | | B60W 30/045 |

* cited by examiner

*Primary Examiner* — Muhammad Shafi (57) ABSTRACT

An automated driving system (402) for automated driving of road vehicle is provided herein. The automated driving system (402) includes a navigation module (202) configured to receive initial waypoints from a road model (602), and further configured to generate modified waypoints, based on squint radar data and inertial measurement unit (604). The automated driving system (402) further includes a guidance module (504) configured to generate a smooth reference path for the vehicle (102) to follow, based upon the modified waypoints. The automated driving system (402) further includes a control module (506) configured to control movement of the vehicle (102) along the generated reference path.

10 Claims, 10 Drawing Sheets

AUTOMATED DRIVING SYSTEM AND METHOD FOR ROAD VEHICLES

CROSS REFERENCE TO RELATED APPLICATION

This application is a continuation-in-part of application Ser. No. 15/854,337, filed on Dec. 26, 2017 having title "".

FIELD OF THE INVENTION

Embodiments of the present invention, generally relate to road vehicles, and in particular relate to automated driving of road vehicles.

BACKGROUND

Automated driving vehicles are considered as future of vehicles. This is reason that significant automaker companies are investing lot of money into the research and development of automated driving vehicles. There are five different levels of autonomous driving depending upon level of automation of vehicle (for example, from basic, advanced or fully automated). Many drivers/users utilize vehicles that operate in semi-autonomous manner (e.g., parking assist, lane assist, etc.).

However, conventional automated driving suffers from many disadvantages. First, conventional automated driving vehicles lack measurable safety and dependability (reliability, availability and maintainability). Further, any automated driving functions available for road vehicles around the world are only assist functions where driver needs to use his discretion and take the risk of whether to use them or not. While guidance navigation and control approach to automated control is used in other vehicles like airplanes or missiles, such approaches have not been utilized for road vehicles. Further, conventional automated driving vehicles suffer from congestion and lack managing road capacities for road transportation. This is because utilization of lanes is not optimized to relieve traffic congestion with required safety assurance.

Therefore, there is a need for an improved system and method for automated driving of vehicles which solves above disadvantages associated with the conventional methods.

SUMMARY

According to an aspect of the present disclosure, an automated driving system (402) for automated driving of road vehicles is provided herein. The automated driving system (402) includes a navigation module (202) configured to receive initial waypoints from a road model (602), and further configured to generate modified waypoints, based on slant distance received from squint radars (106) and inertial measurement unit (604). The automated driving system (402) further includes a guidance module (504) configured to generate a smooth and asymptotically stable reference path for the vehicle (102) to follow, based upon the modified waypoints. The automated driving system (402) further includes a control module (506) configured to control movement of the vehicle (102) along the generated reference path by using vehicle dynamical model.

According to another aspect of the present disclosure, a computer-implemented method for automated driving of road vehicles is provided herein. The computer-implemented method includes receiving initial waypoints from a road model (602), and further configured to generate modified waypoints, based on slant distance received from squint radars (106) and inertial measurement unit (604). The computer-implemented method further includes generating a smooth reference path for the vehicle (102) to follow, based upon the modified waypoints. The computer-implemented method finally includes controlling movement of the vehicle (102) along the generated reference path.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must).

Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
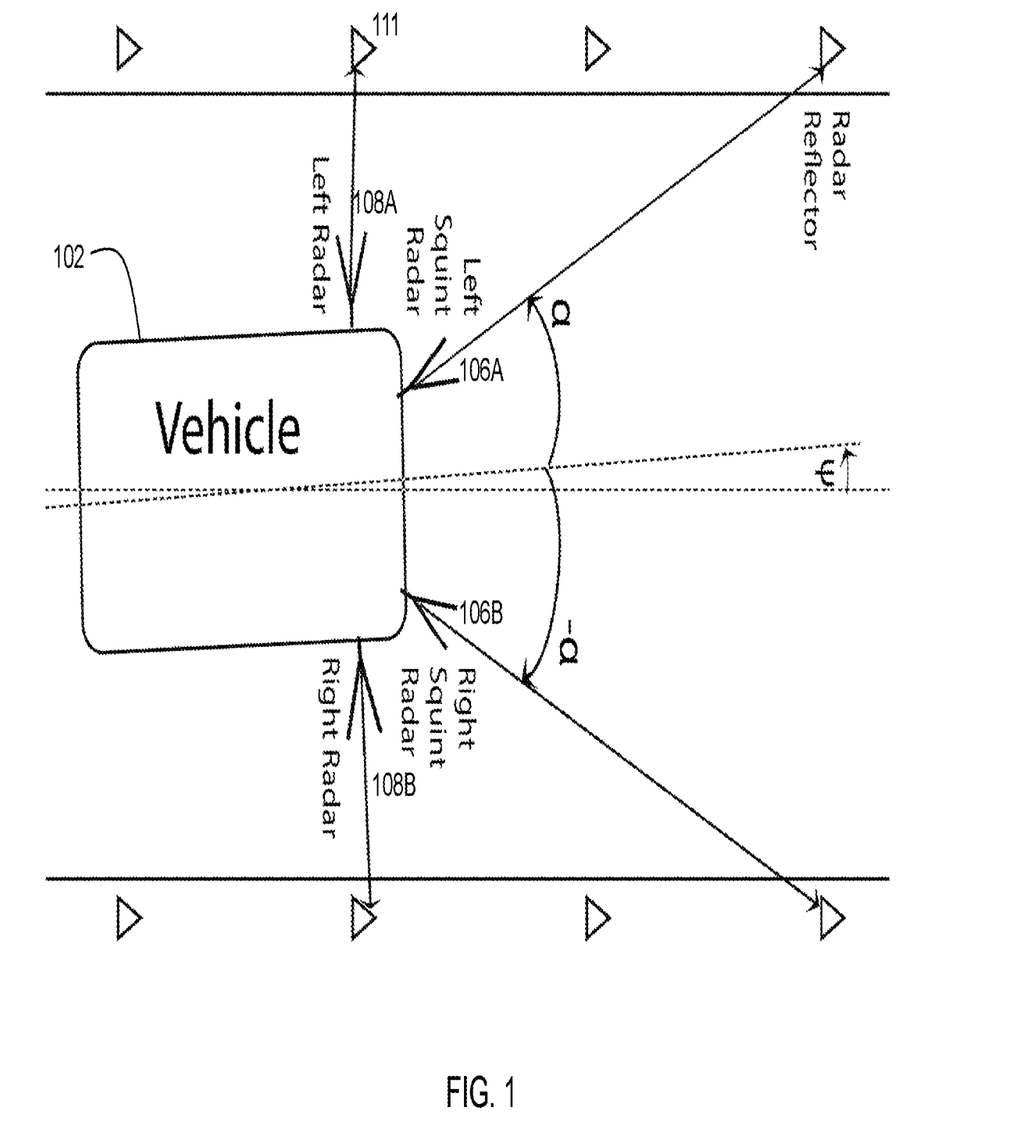
FIG. 1 is an exemplary diagram depicting an automated driving vehicle on road, according to an embodiment of the present invention.

FIG. 1 illustrates an exemplary network environment (100) where various embodiments of the present invention may be implemented. The network environment (100) includes an automated driving vehicle (102) on a road, according to an embodiment of the present invention. The automated driving vehicle (102) includes a radar system (110) shown in FIG. 6. The radar system (110) includes a pair of front radars (104A and 104B) (shown in the FIG. 2). In an embodiment, the front radars (104A and 104B) are configured to detect any obstacles and any preceding vehicle in front of the vehicle.

The radar system (110) further includes a pair of squint radars (106A and 106B), as shown in the FIG. 1. In an embodiment, the squint radars (106A and 106B) are configured to detect radar reflectors in a direction between front and side of the vehicle. The radar system (110) further includes a pair of side radars (108A and 108B), as shown in the FIG. 1. In an embodiment, the side radars (108A and 108B) are configured to detect any radar reflectors in side of the vehicle. According to an embodiment of the present invention, the radar system (110) further includes a radar signal processing unit (not shown in figure).

Figure 2:
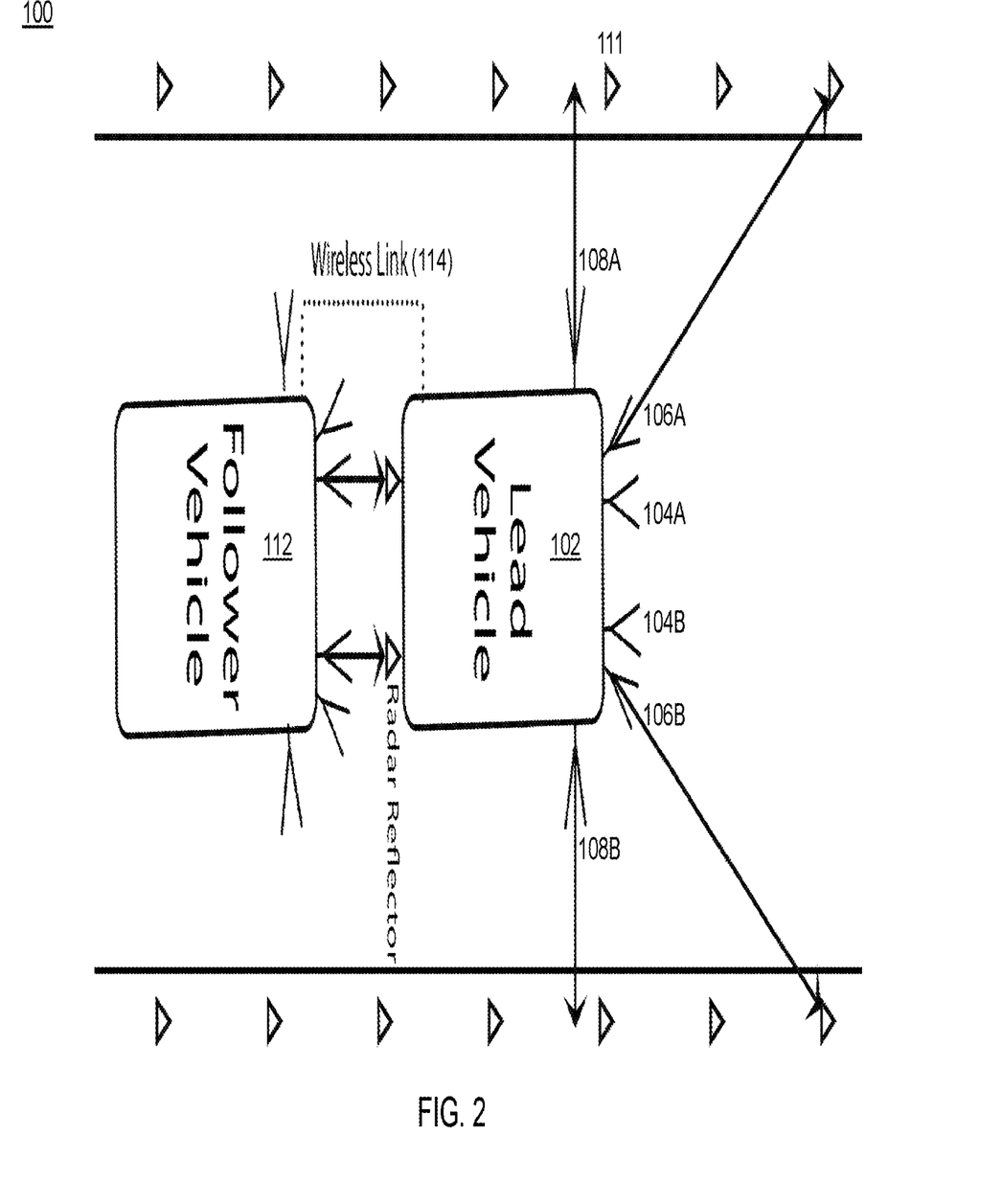
FIG. 2 is an exemplary diagram depicting a lead vehicle and follower vehicle, according to an embodiment of the present invention.

FIG. 2 is an exemplary diagram depicting a lead vehicle (102) and follower vehicle (112), according to an embodiment of the present invention. As shown in the figure, the network environment (100) includes a lead vehicle (102) and a follower vehicle (112). In an embodiment, both the lead vehicle (102) and the follower vehicle (112) include front radars (104A and 104B), squint radars (106A and 106B), and side radars (108A and 108B).

Further, according to an embodiment of the present invention, there is a wireless link (114) between the lead vehicle (102) and the follower vehicle (112), as shown in the FIG. 2. In an embodiment, the wireless link (114) is configured to support necessary communication required between the lead vehicle (102) and the follower vehicle (112).

Figure 3:
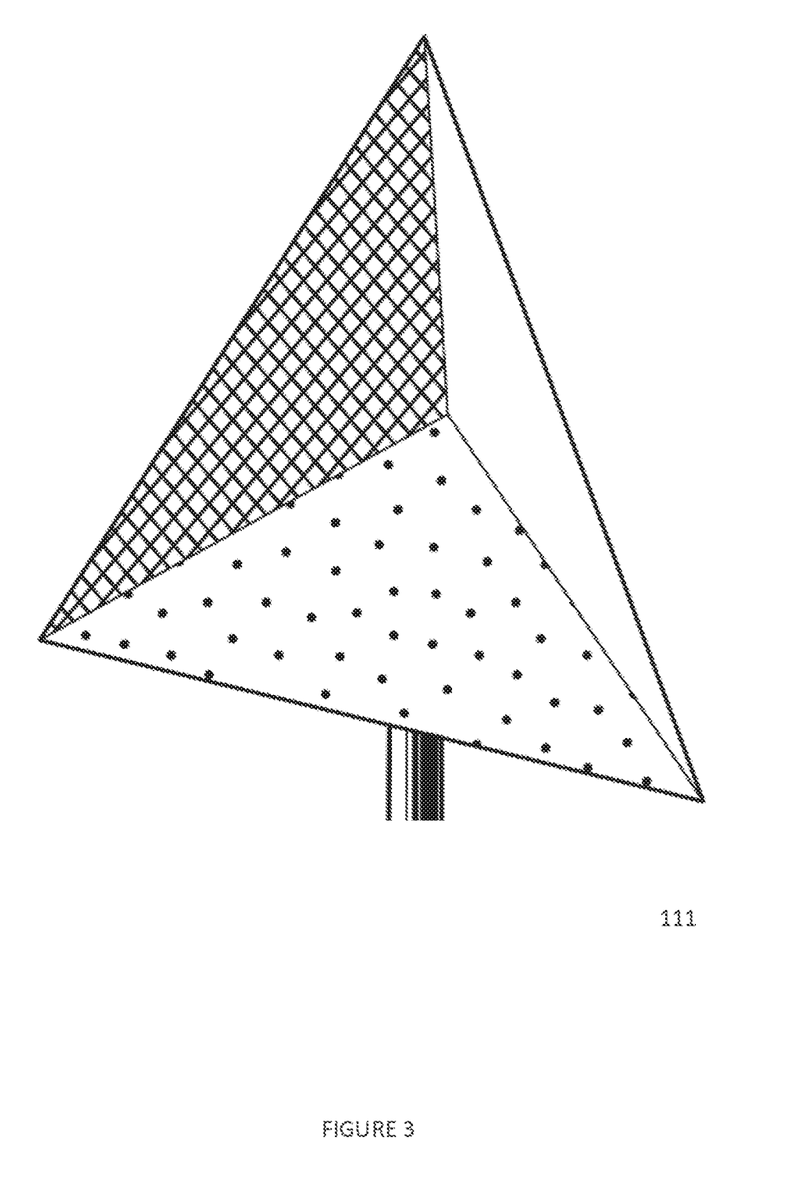
FIG. 3 is an exemplary diagram of radar reflector placed along the road, according to an embodiment of the present invention.

FIG. 3 is a schematic diagram of radar reflectors (111) placed along the road, according to an embodiment of the present invention. In an embodiment, network environment (100) includes a plurality of radar reflectors (111A, 111B . . . 111N). In an embodiment, the radar reflectors (111) are passive radar reflectors that are placed along the road or guideway. The radar reflectors (111) are coupled with the radar system (110), and are configured to reflect back signals to the radar system.

In an embodiment, the radar system (110) (that is provided on the road vehicle) is configured to facilitate estimation of road blocks and side blocks at the road for the automated driving vehicles (102) and (112), based on reflected signals from the radar reflectors (111). Those skilled in the art will appreciate that the radar reflectors (111) are configured to be optimized for safety and performance. For example, an appropriate distance may be predetermined between the radar reflectors (111) to increase safety and performance. Further, in an embodiment, the radar reflectors (111) and the radar system (110) are optimized for roadblocks detection (for example, to maximize probability of detection of roadblocks, and to minimize probability of false alarm).

Figure 4:
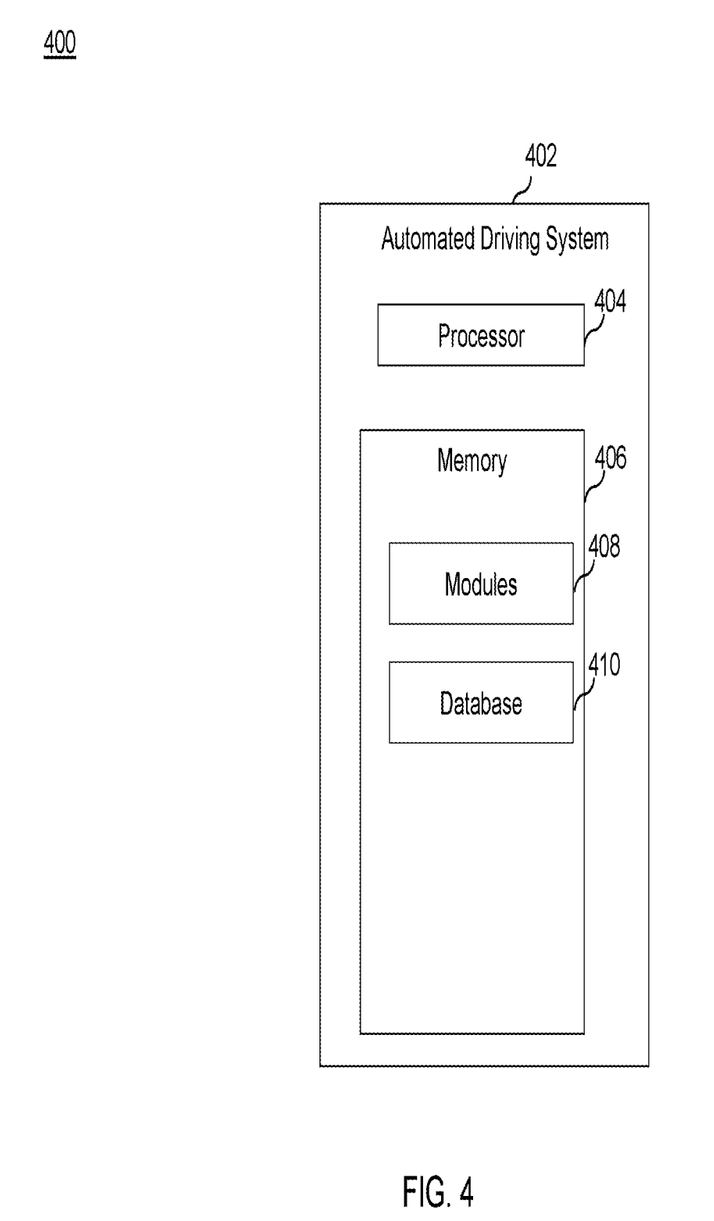
FIG. 4 is a block diagram depicting an automated driving system according to an embodiment of the present invention.

FIG. 4 illustrates an automated driving system (402) integrated/installed on every vehicle, for example, vehicle (102) and (112). In an embodiment of the present invention, the automated driving system (402) may be a computing device. The automated driving system (402) includes a processor (404) and a memory (406). In one embodiment, the processor (404) includes a single processor and resides at the automated driving system (402). In another embodiment, the processor (404) may include multiple sub-processors.

Further, the memory (406) includes one or more instructions that may be executed by the processor (404) to receive initial waypoints, generate modified waypoints, generate a smooth reference path for the automated driving vehicle (102), and control movement of the automated driving vehicle (102) along the generated reference path with measurable safety and dependability.

In one embodiment, the memory (406) includes the modules (408), a database (410), and other data (not shown in figure). The other data may include various data generated during processing the waypoints generated by modules. In one embodiment, the database (410) is stored internal to the automated driving system (402). In another embodiment, the database (410) may be stored external to the automated driving system (402), and may be accessed via a network (not shown in figure). Furthermore, the memory (406) of the automated driving system (402) is coupled to the processor (404).

Figure 5:
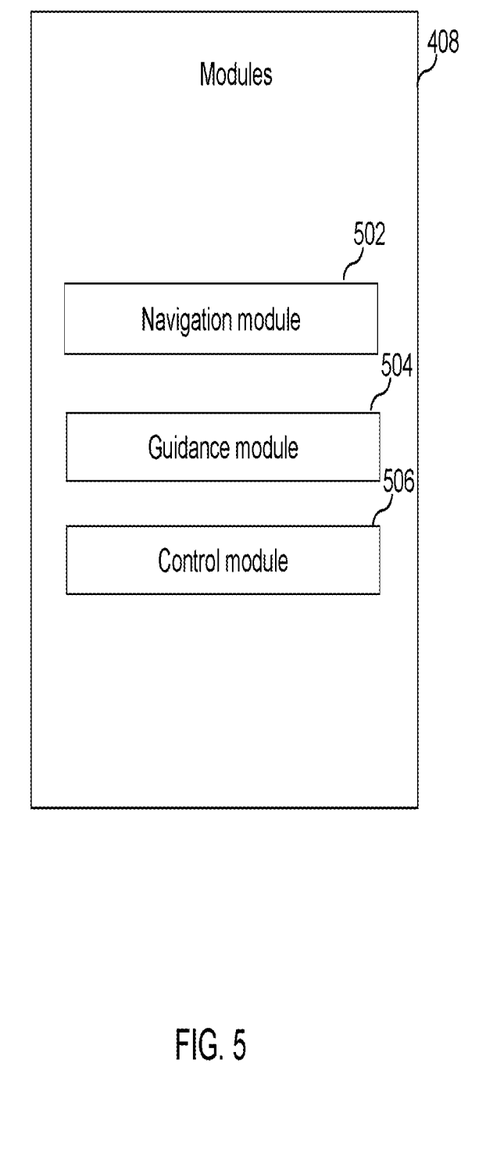
FIG. 5 is a block diagram of modules stored in memory, according to an embodiment of the present invention.
Figure 6:
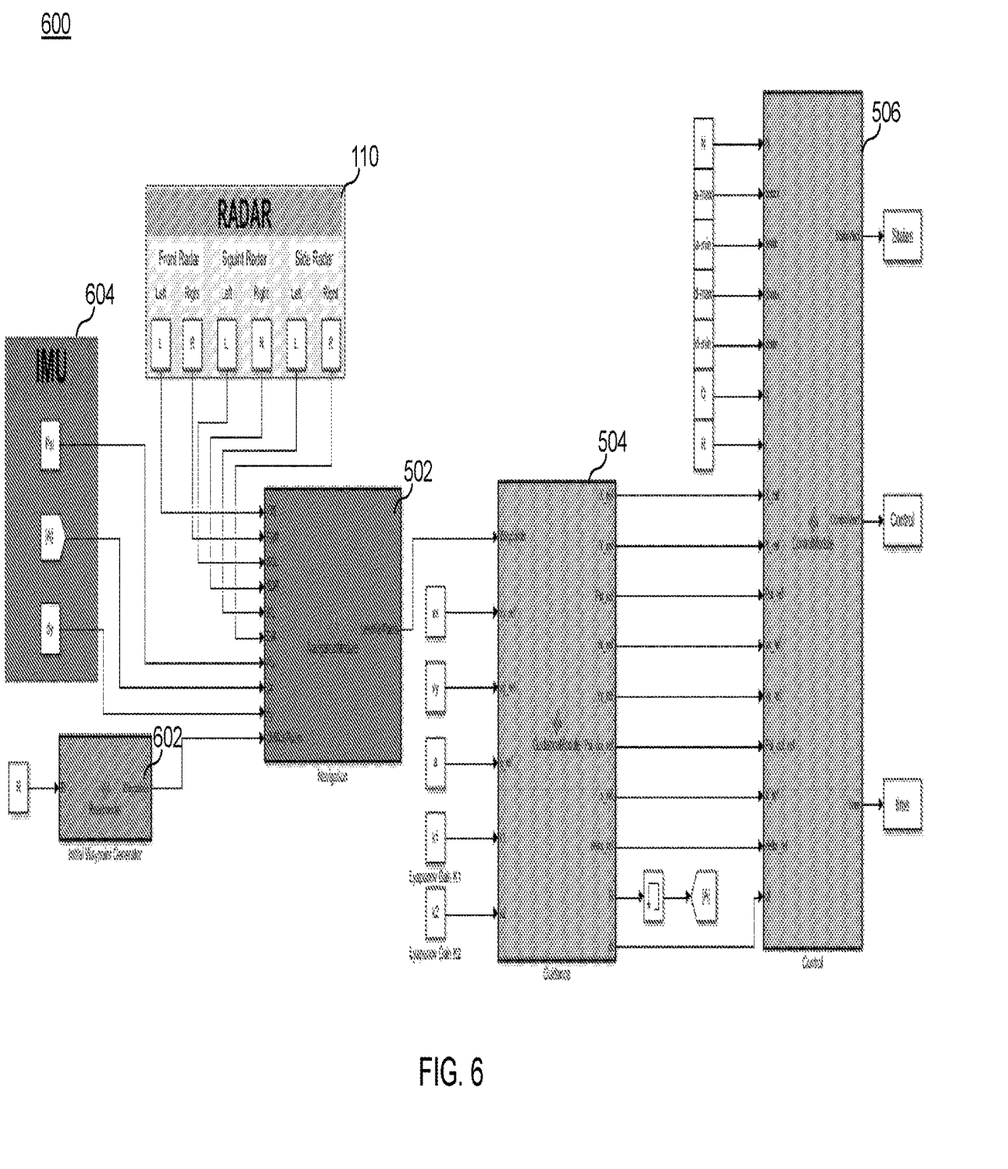
FIG. 6 is a schematic diagram depicting interconnection between radars, IMU, and various modules of the automated driving system, according to an embodiment of the present invention.

Referring to FIG. 5, the modules (408) includes a navigation module (502), a guidance module (504), and a control module (506). The modules (408) are instructions stored in the memory and may provide for automated driving of the vehicle (102). FIG. 6 is a schematic diagram depicting interconnection between radars, IMU (or inertial measurement unit), and various modules of the automated driving system, according to an embodiment of the present invention.

According to an embodiment of the present invention, a road model (602) (shown in FIG. 6) is stored in memory (406). The road model (602) is configured to act as an initial waypoint generator. Those skilled in the art will appreciate that the initial waypoint generated by the road model (602) may be pre-determined or dynamically generated depending upon a road the vehicle is travelling. In an embodiment, the road model (602) generates the initial waypoint and provides to the navigation module (502).

The navigation module (502) is configured to receive the waypoints generated by the road model (602). Further, the navigation module (502) is configured to receive slant distance from squint radars (106), and lateral distance from side radars (108). According to an embodiment of the present invention, the radar system (110) includes the radar signal processing unit that is configured to perform radar signal processing before passing the measurements to the navigation module (502). In an embodiment, the radar signal processing unit is configured to utilize various radar signal processing algorithms to perform clutter rejection and spatial filtering and to optimize accuracy and precision of radar measurements (for example, radial velocity, radial distance). The radar system (110) is further configured to pass these measurements to the navigation module (502) which utilizes them in generation of the waypoints.

In an embodiment, the slant distances provided by the radar system (110) may include waypoints of various roadblocks (if any) in front of the radar, in side of the radar, and in a direction between front and side of the radar. Those skilled in the art will appreciate that the lead vehicle (102) does not need information about roadblocks behind it, as those roadblocks information will be needed by only follower vehicle (112) and front radars of the follower vehicle (112) are configured to collect such information. In an embodiment, the navigation module (502) is configured to generate new waypoints or modified way points based on new or dynamic information received from the various radars provided on the vehicle (102).

Further, the navigation module (502) is configured to receive input from the inertial measurement unit (IMU) (604). In an embodiment, the IMU (604) is configured to provide inter waypoint positional information and yaw information (i.e., relative position information) of each vehicle. The IMU (604) may include accelerometers to provide orthogonal acceleration measurements and gyros to provide orthogonal angular displacement (rotation) information. Those skilled in the art will appreciate that IMU facilitates effective lane utilization and operational efficiency, and provides reliable lane keeping and platooning.

According to an embodiment of the present invention, the navigation module (502) is configured to generate modified waypoints based on the received waypoints from the road model (602), IMU (604), and the radar system (110), when it receives the slant distance from the squint radar (106). In an embodiment, modified waypoints may be based on various inputs about relative position of the vehicles from the IMU (604), information about various roadblocks from the radar system (110) and initial waypoints generated by the road model (602). The navigation module (502) is further configured to ignore oldest waypoints depending upon the look-ahead distance (k-waypoints ahead of the vehicle).

According to an embodiment of the present invention, as the vehicle (102) moves forward, the radars system (110) may detect various roadblocks and generate slant distance received from squint radars (106). In an embodiment, a pair of collinear radar reflectors is placed on either side of the road (as shown in FIGS. 1 and 2).

In an embodiment, based upon predetermined distance of these radar reflectors from the vehicle (102), a new waypoint may be determined (for example, on the center of the road) by the navigation module (502) and may be added into the memory. Further, at the same time, the first waypoint (oldest waypoint) may be deleted from the memory by the navigation module (502). In an embodiment, the navigation module (502) is configured to send these modified waypoints to the guidance module (504).

The guidance module (504) is configured to receive a set of 'k' waypoints from the navigation module (502). Further, according to an embodiment of the present invention, the guidance module (504) is configured to generate an asymptotically stable, smooth reference path for the vehicle (102) to follow/drive. In an embodiment, the guidance module (504) is configured to apply a positive definite Lyapunov function with an impact angle constraint to keep the vehicle aligned with next segment at each way point to generate an optimal trajectory for the discovered waypoints. In an embodiment, the reference path is generated from a Lyapunov-based pursuit guidance law and is given to the control module (506), as shown in FIG. 6.

According to an embodiment of the present invention, the path thus generated is asymptotically stable about an equilibrium point. In an embodiment, the path generated is in the 'XY' plane. The guidance module (504) is configured to resolve the reference 'X' coordinates and reference 'Y' coordinates.

Further, the guidance module (504) is configured to calculate reference yaw angle, yaw rate, lateral velocity, acceleration and steering angle from the 'X-Y' coordinates. In an embodiment, longitudinal velocity, Lyapunov gains 'k1' & 'k2' may also be set by the user/controller and given to the guidance module (504).

Further, according to an embodiment of the present invention, the control module (506) is configured to control movement of the vehicle (102) along the reference path generated by the guidance module (504). In an embodiment, the control module (506) is configured to utilize a model predictive controller with vehicle dynamic model and a predictive horizon for following the reference path or trajectory received from the guidance module (504).

In an embodiment, the control module (506) is configured to use a control algorithm such as 'Model Predictive Control (MPC)'. Those skilled in the art will appreciate that the model predictive control algorithm uses a state space model derived from the dynamic equations to minimize the deviation from the reference path. In an embodiment, the control module (506) is configured to minimize the deviations by adjusting the steering angle and acceleration of the vehicle.

Figure 7:
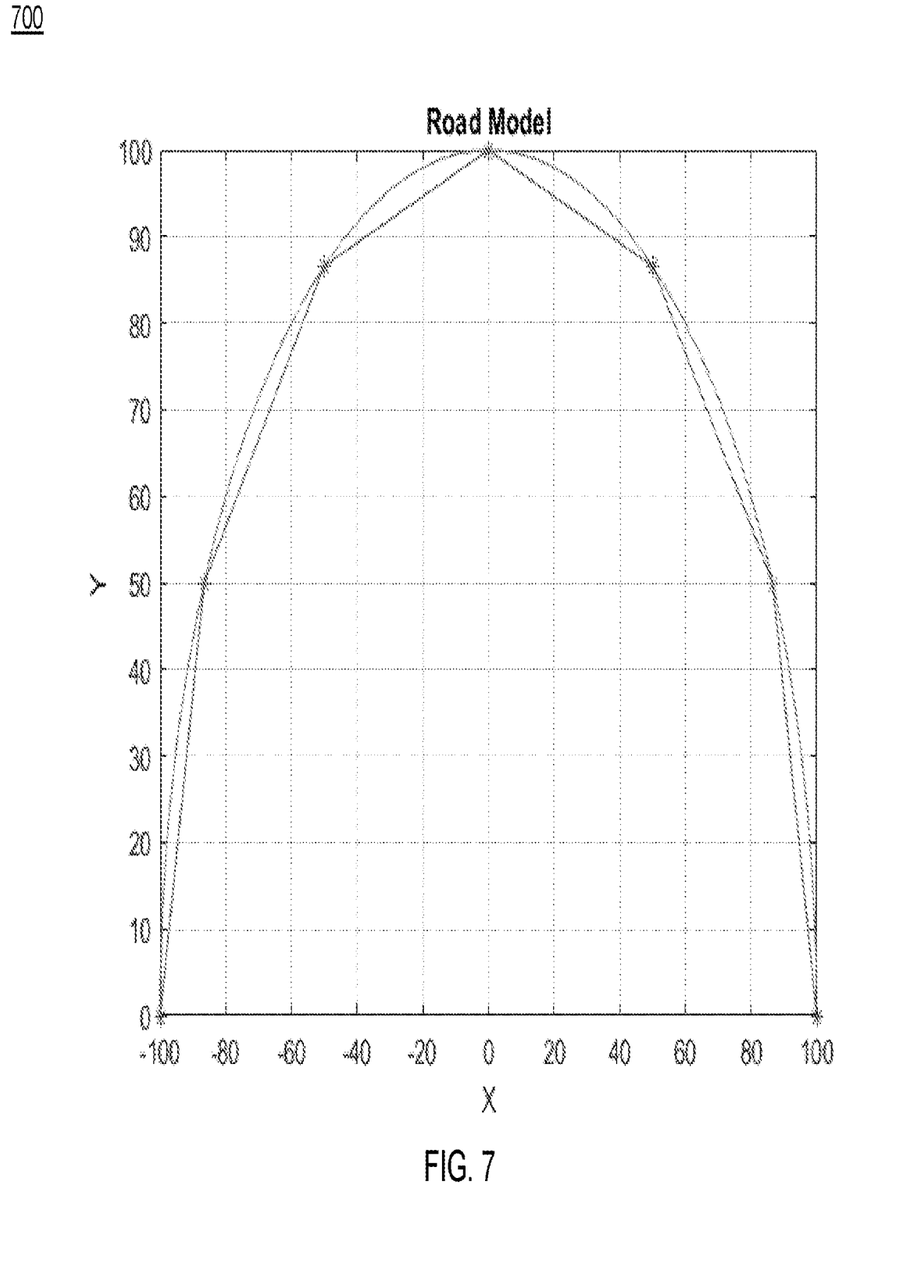
FIG. 7 is a graph depicting initial waypoints generated by the road model, according to an embodiment of the present invention.

FIG. 7 is a graph depicting reference path by connecting initial waypoints from the road model. In an embodiment, the vehicle (102) moves in 'XY' plane, 'X' coordinates are chosen to be longitudinal direction, and 'Y' coordinates to be lateral direction. Further, in an embodiment, the straight-line segment joining each waypoint is line of sight (LOS) for the vehicle (102), and impact angle is angle subtended by two adjacent LOS segments.

Figure 8:
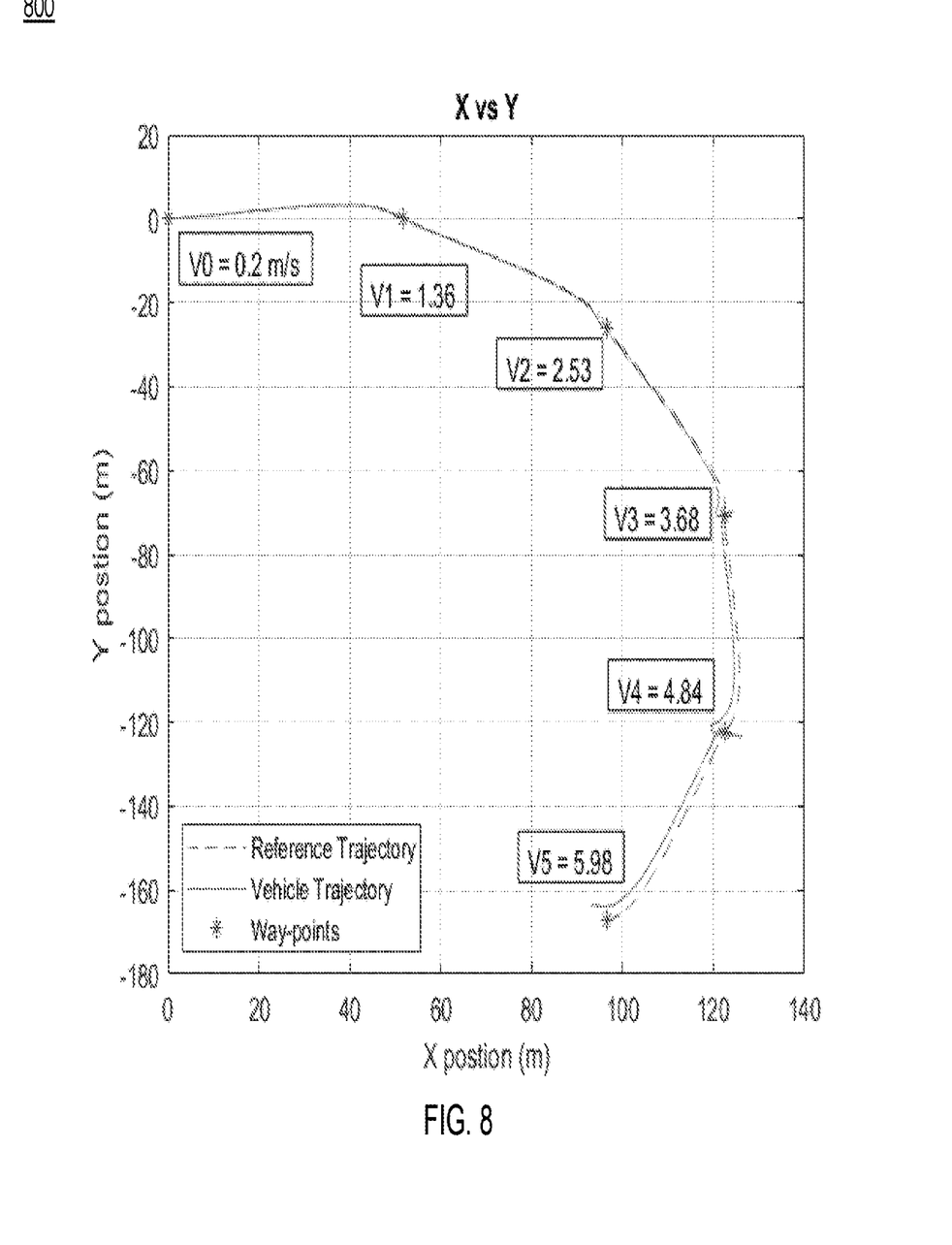
FIG. 8 is a graph depicting vehicle following the reference path, according to an embodiment of the present invention.

FIG. 8 is a graph depicting vehicle following the reference path in the XY plane. In an embodiment, as shown in FIG. 8, the dashed line indicates reference path, the continuous line indicates path taken by the vehicle, and the asterisk (*) indicates waypoints. Further, in an embodiment, as the vehicle moves forward, it may hit a new radar reflector on the way, and when two such collinear radar reflectors are detected, a new way point may be determined. The new way point is added to the memory (406) and the oldest waypoint is dropped. Further, the reference path is generated by the guidance module (504) from the modified waypoints. According to an embodiment of the present invention, the deviations from the reference path are minimized using the steering and acceleration by controller.

Figure 9:
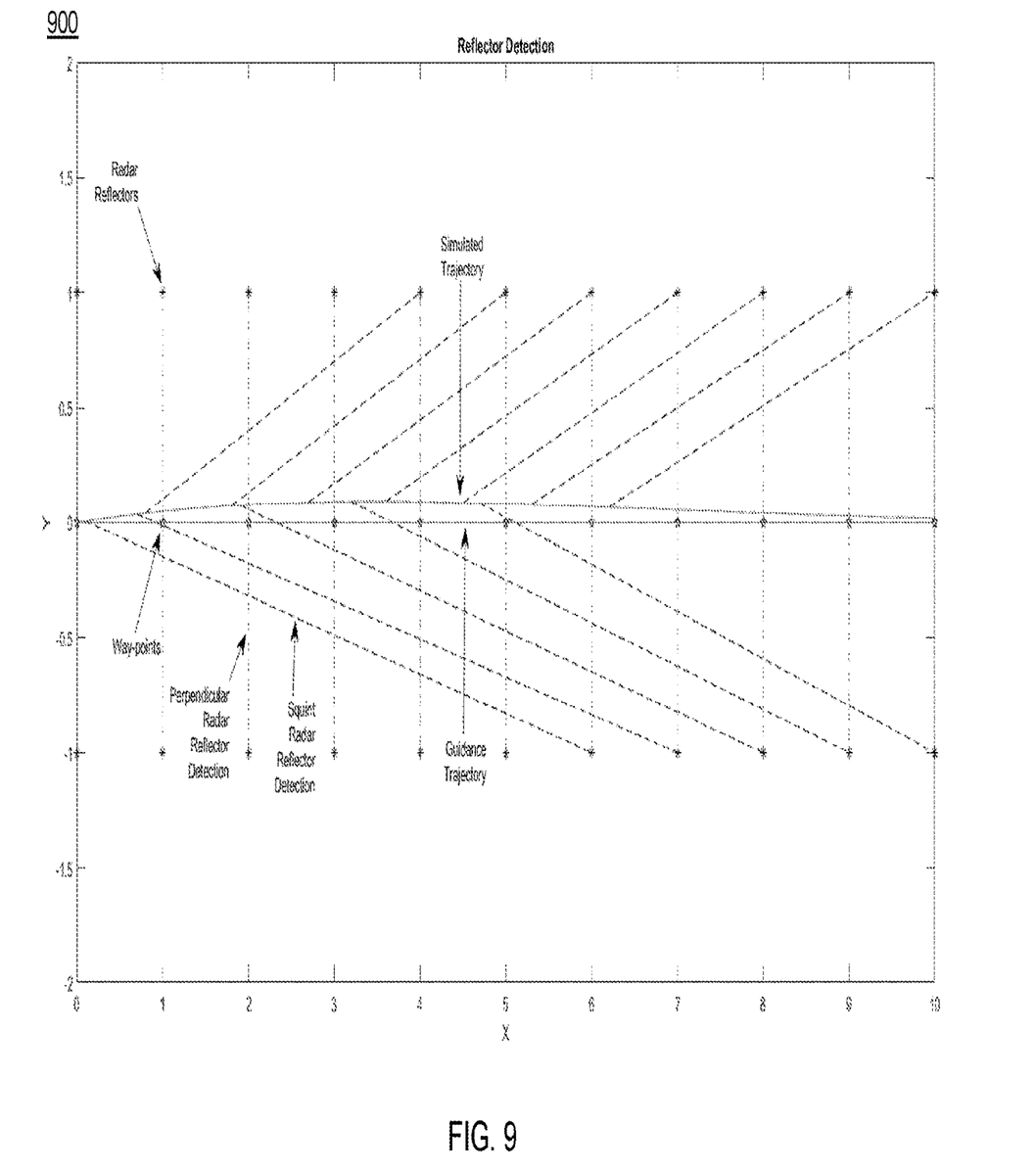
FIG. 9 is a graph depicting vehicle detecting radar reflectors as and when it follows the reference path, according to an embodiment of the present invention.

FIG. 9 is a graph depicting vehicle detecting radar reflectors as and when it follows the reference path. As shown in FIG. 9, the dashed line indicates detected radar reflectors, the straight-line indicates reference path, and curved line indicates path taken by the vehicle. Further, the asterisk (*) are the radar reflectors, and the stars are waypoints.

Figure 10:
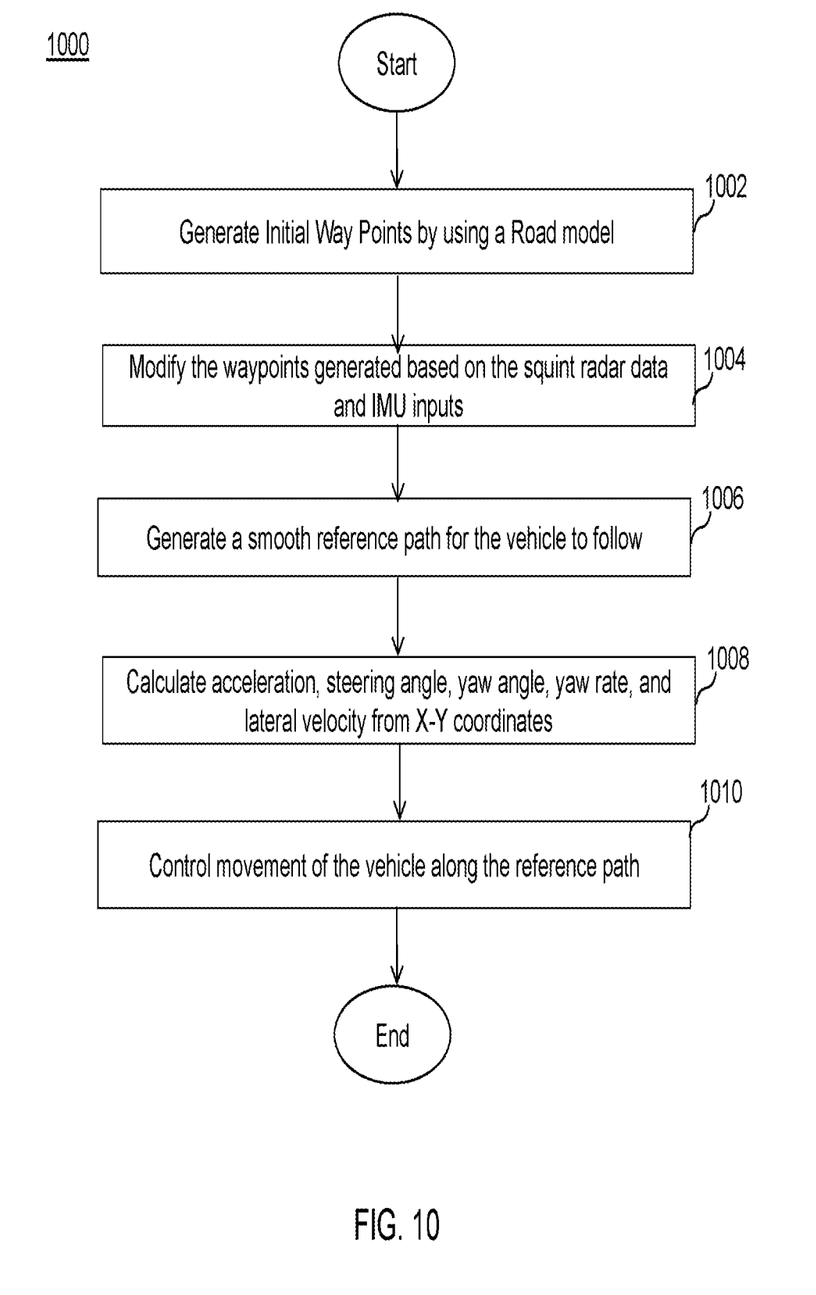
FIG. 10 depicts an exemplary flowchart illustrating a method of automated driving of vehicle with safety and dependability, according to an embodiment of the present invention.

FIG. 10 illustrates an exemplary flowchart illustrating a method of automated driving of vehicle with safety and dependability, according to an embodiment of the present invention.

Initially, at step 1002, initial waypoints are generated using a road model. In an embodiment, a road model (602) stored in memory (406) may be used as an initial waypoint generator. At step 1004, the initially generated waypoints are modified. In an embodiment, the initially generated waypoints may be modified based on radar data and inertial measurement unit (IMU) inputs.

In an embodiment, a pair of collinear radar reflectors is placed on either side of the road. The modified waypoints may be based on various inputs about relative position of the vehicles from the IMU (604), information about various roadblocks from the radar system (110) and initial waypoints generated by the road model (602). Further, when new waypoints have been received from the radar system, first waypoint (or initially generated waypoint) may be dropped from the memory.

At step 1006, a smooth reference path is generated. In an embodiment, the path generated is in the 'XY' plane and asymptotically stable about an equilibrium point. The reference X coordinates and reference Y coordinates may be resolved based upon predetermined distance between the radar reflectors located along the road.

At step 1008, yaw angle, yaw rate, lateral velocity, acceleration, and steering angle may be determined. Those skilled in the art will appreciate that the longitudinal velocity and Lyapunov gains (such as 'k1' & 'k2') may also be set by the user/controller. At step 1010, movement of the vehicle (102) is controlled along the generated reference path. In an embodiment, a control algorithm such as 'Model Predictive Control' (MPC) may be used for controlling the vehicle (102) with measurable safety and dependability.

The automated driving system (402) and the method (1000) performed by the automated driving system (402) advantageously provides automated driving of the vehicles on the road. Further, the automated driving system (402) provided by the present invention enables the application of automation to road vehicles to directly address safety, congestion and system capacities for road transportation. The automated driving system (402) also provides for automating the driving of road vehicles in dedicated lanes to increase lane capacities and relieve traffic congestion with required safety assurance.

Further, the automated driving system (402) automates all three driving functions (braking, throttle and steering) with required and measurable dependability (reliability, availability and maintainability). Those skilled in the art will appreciate that any automated driving functions available for road vehicles around the world are only assist functions where driver needs to use his discretion and take the risk of whether to use them or not. However, the automated driving system (402) makes it possible to deploy the automation technology with the required safety and dependability to road vehicles.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An automated driving system for automated driving of a road vehicle, the automated driving system comprising a processor and a memory, the memory storing:
    a navigation module configured to receive initial waypoints from a road model, and further configured to generate modified waypoints, based on squint radar data and inertial measurement unit provided on the road vehicle;
    a guidance module configured to generate a smooth reference path for the vehicle to follow, based upon the modified waypoints; and
    a control module configured to control movement of the vehicle along the generated reference path.

2. The automated driving system of claim 1, wherein the radar system of the road vehicle includes a pair of front radars, a pair of squint radars, and a pair of side radars.

3. The automated driving system of claim 2, wherein the radar system is configured to receive reflected signals from passive radar reflectors located along the road.

4. The automated driving system of claim 1, wherein the navigation module is further configured to ignore oldest waypoints based upon a look-ahead distance and data provided by the radar system.

5. The automated driving system of claim 1, wherein the inertial measurement unit is configured to provide inter waypoint positional information and yaw information of the road vehicle.

6. The automated driving system of claim 1, wherein the guidance module is configured to resolve the reference 'X coordinates' and reference 'Y coordinates'.

7. The automated driving system of claim 1, wherein the guidance module is configured to calculate reference yaw angle, yaw rate, lateral velocity, acceleration and steering angle from the 'X-Y coordinates'.

8. The automated driving system of claim 1, wherein the control module is configured to use 'model predictive control' (MPC) algorithm.

9. The automated driving system of claim 1, wherein the control module is configured to minimize deviations by adjusting steering angle and acceleration of the vehicle.

10. A computer-implemented method for automated driving of a road vehicle, the computer-implemented method comprising:

receiving initial waypoints from a road model, and further configured to generate modified waypoints, based on squint radar data and inertial measurement unit provided on the road vehicle;

generating a smooth reference path for the vehicle to follow, based upon the modified waypoints; and controlling movement of the vehicle along the generated reference path.

* * * * *